United States Patent Office 3,367,685
Patented Feb. 6, 1968

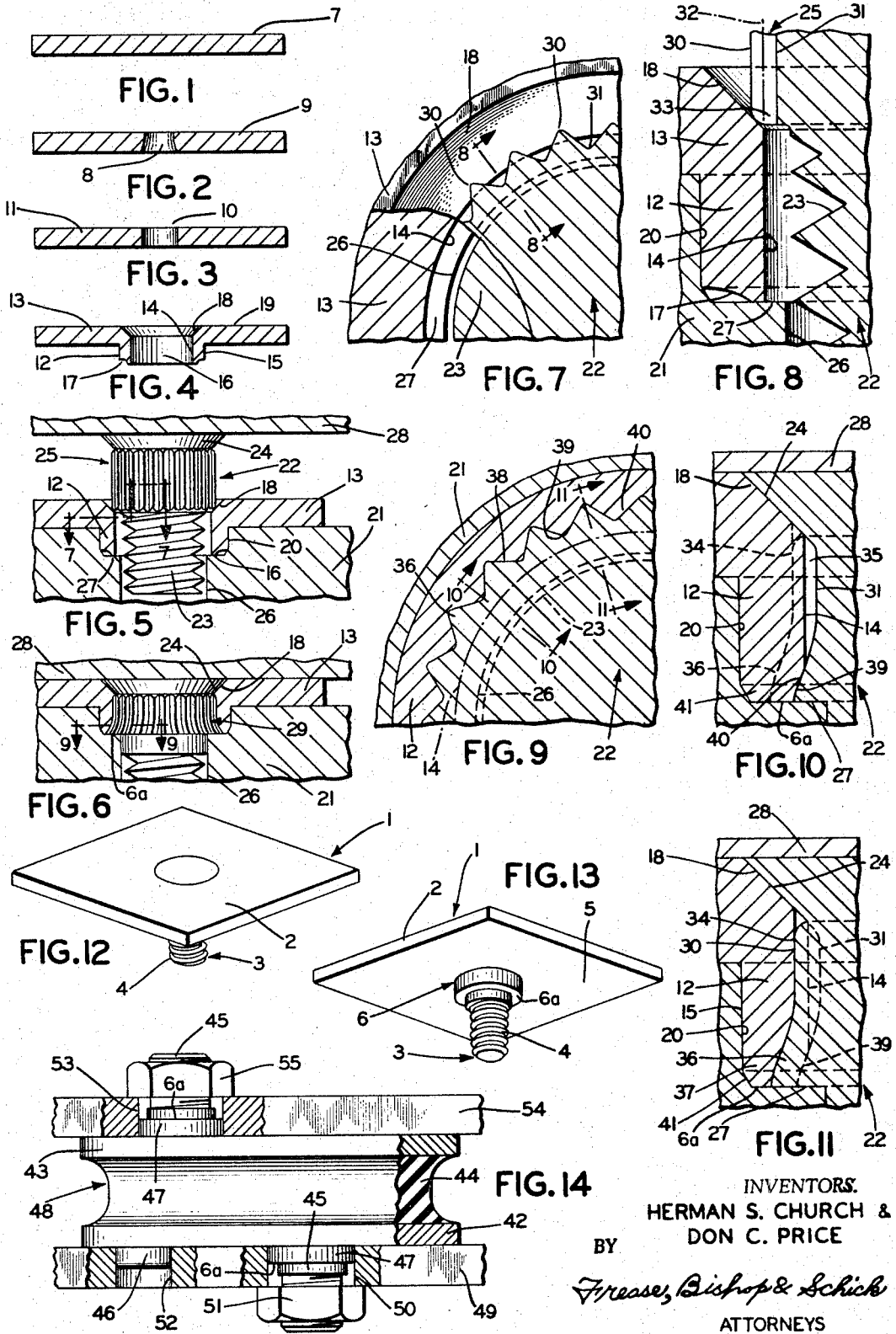

3,367,685
PLATE METAL STRUCTURE WITH INTEGRAL
THREADED STUD
Herman S. Church, Cuyahoga Falls, and Don C. Price,
Canton, Ohio, assignors to The Monarch Rubber Company, Hartville, Ohio, a corporation of Ohio
Filed Nov. 12, 1965, Ser. No. 507,414
2 Claims. (Cl. 287—20.3)

ABSTRACT OF THE DISCLOSURE

A plate metal product having an integrally connected threaded stud fastener projecting from one surface of the plate metal, the stud having a flat top head seated in a complementary recess formed in the plate metal with the flat top flush with the other plate surface to provide a uniform bond when said other plate surface is bonded to rubber; the stud having a threaded shank and spline ribs and grooves extending axially between the stud head and threaded shank; the ribs being embedded in the inner surface of an opening through a sleeve projecting integrally from said one plate surface around the stud spline formations; and portions of the spline formations being expanded into the sleeve metal at the open end of the sleeve.

---

The new structures of the invention may be made by the methods set forth in our copending application SN 506,300, filed November 4, 1965, entitled, Manufacture of Plate Metal Parts With Threaded Stud Fasteners. The invention relates to plate metal products formed to desired shape by bending, stamping or drawing operations and having one or more threaded stud fasteners integrally connected with the plate metal to project a threaded shank from one surface of the plate metal product.

Heretofore, a plate metal part has been made with a projecting threaded stud in which a stud member head is engaged against one surface of the part, a threaded stud shank projects from the other surface of the part, and a stud spline formation connecting the head and shank is pressed axially through an opening in the plate metal part so that the spline formation radially engages the metal around the opening to prevent rotation of the stud with respect to the part. Alternatively, a plate metal part has been connected to a threaded stud with a stud head engaged against one surface of the part, with the stud shank extending through an opening in the part, with a threaded stud portion projecting from the other surface of the part, and with the head welded to the plate metal part.

In each instance, the stud head projects from the plate metal surface opposite that from which the threaded shank extends. This has presented a problem where the plate metal product with an integral threaded stud becomes a component of a composite molded metal-rubber product used extensively in many fields, such for example, as a motor mount in automotive construction. In such a composite metal-rubber product, molded rubber is bonded to the stud head and to the adjacent surface of the plate metal component. However, in use the projecting stud head affects rubber displacement or movement and affects the bond between the rubber, and the stud head and surface of the metal part to which the rubber is bonded. This in turn affects the dynamic rate of and stress points in the rubber resulting in abrasion and tearing of the rubber at the bond during extended continued relative movement between portions of the rubber, and the plate metal and stud head bonded thereto, incident to operation of an automobile equipped with the composite metal-rubber product.

Furthermore, where the head of a metal stud is welded to a plate metal part to connect such components together, the welding may adversely affect the mechanical properties of one or both of the components.

Also, where the connection is made by a spline formation on the stud pressed into and through an opening in the plate metal part, although the assembly may resist relative rotation between the stud and plate metal part, the assembly is not secure against axial separation of the parts and, therefore, the assembly is not integrated or unified.

We have discovered and have made integrated plate metal parts with threaded stud fasteners which solve these longstanding and unsolved problems in the art. The new structure involves the fundamental concept of providing a plate metal part with a tubular sleeve in which spline formations extending axially of a threaded stud are engaged against relative rotation between the stud and sleeve; in which a stud head portion preferably has countersunk engagement with a complementary formation in the metal plate at one end of the sleeve, and an expanded stud spline portion has engagement with the other end of the sleeve to secure the stud against axial removal from the sleeve; and in which the sleeve serves as a pilot for accurately locating the integrated product with respect to another part on which the integrated part is assembled and mounted by nut means engaged with the stud threads.

Accordingly, it is an object of the present invention to provide new plate metal products having threaded stud members integrally connected therewith.

Furthermore, it is an object of the present invention to provide a new integrated threaded stud plate metal product which eliminates the projection of any stud head from the surface of the plate metal part to which rubber may be bonded, or which is opposite that surface from which the threaded shank of the stud projects.

Also, it is an object of the present invention to provide a plate metal product having a threaded stud integrally connected rigidly with and extending from one surface of a plate metal part, and having a pilot formation also extending from said one surface concentric with the threaded stud and adapted accurately to locate the plate metal product with reference to another part when the threaded stud is bolted to such other part.

Finally, it is an object of the present invention to provide new plate metal products having integrated projecting threaded studs which eliminate difficulties heretofore encountered in the art; which avoid problems, reduce costs and have enhanced characteristics; which provide products eliminating difficulties in the manufacture of composite metal-rubber products; and which achieve the stated objects in a simple, effective and inexpensive manner, thereby satisfying needs existing in the art.

These and other objects and advantages apparent to those skilled in the art from the following description and claims may be obtained, the stated results achieved, and the described difficulties overcome, by the products, structures, devices, elements, arrangements and parts which comprise the present invention, the nature of which is set forth in the following general statements, preferred embodiments of which—illustrative of the best modes in which applicants have contemplated applying the principles—are set forth in the following description and shown in the drawing and which are particularly and distinctly pointed out and set forth in the appended claims forming part hereof.

The nature of one aspect of the present invention may be stated in general terms as preferably including in plate metal structures equipped with integral threaded studs, a plate metal, preferably steel, wall having a tubular sleeve formed with concentric inner and outer surfaces projecting integrally from at least one surface of the wall;

a stud head receiving recess formed in the plate metal at the intersection of the other surface of the plate metal and the inner sleeve surface; a stud member having a head portion complementary in contour to the contour of said head receiving recess, a threaded shank, and a spline formation comprising alternate ribs and grooves extending axially of the stud and connecting the head portion and threaded shank; the spline ribs and grooves having a pitch diameter preferably equal to the inner diameter of the sleeve prior to assembly of the stud member with the plate metal wall; the stud member being telescoped into and the spline means being pressed axially into the sleeve with the stud head portion engaged in said recess; at least portions of the spline ribs outside said pitch diameter being embedded into sleeve metal; and the spline means metal adjacent the open end of the sleeve being expanded radially, thereby trapping sleeve metal axially between the radially expanded spline means portion and the stud head portion.

The nature of another aspect of the present invention may be stated in general terms as preferably including in composite molded metal-rubber products, the combination of a plate metal component including a plate metal part provided with an integral sleeve having inner and outer concentric surfaces projecting from one surface of said part, a stud having a portion extending through and integral with said sleeve and having a threaded shank projecting from said sleeve and said one surface only of the plate metal part, the other surface of the plate metal component with its integral stud preferably presenting a flat face extending over, around and beyond that portion of the component from which the stud projects at its said one surface, rubber material bonded to and throughout said flat face to present uniform rubber displacement characteristics, and said sleeve forming a concentric pilot surrounding the stud adjacent the surface of the plate metal part from which the threaded stud shank projects.

By way of example, the improved products as well as a procedure for the manufacture thereof are shown somewhat diagrammatically in the accompany drawing forming part hereof in which:

FIGURES 1, 2, 3, and 4 illustrate somewhat diagrammatically certain steps carried out in forming the improved product;

FIG. 5 is an enlarged fragmentary sectional view illustrating a threaded stud at the beginning of an operation of inserting the stud into the sleeve of a plate metal part formed by the steps shown in FIGS. 2, 3, and 4;

FIG. 6 is a view similar to FIG. 5 illustrating the completion of the stud insertion step;

FIG. 7 is an enlarged fragmentary sectional view looking in the direction of the arrows 7—7, FIG. 5;

FIG. 8 is a fragmentary sectional view looking in the direction of the arrows 8—8, FIG. 7;

FIG. 9 is a view similar to FIG. 7 but taken on the line 9—9, FIG. 6;

FIG. 10 is a view similar to FIG. 8 looking in the direction of the arrows 10—10, FIG. 9;

FIG. 11 is a view similar to FIG. 10 taken on the line 11—11, FIG. 9;

FIG. 12 is a perspective view of a plate metal product having an integrally connected stud fastener, looking toward the plate metal surface opposite that from which the threaded stud projects;

FIG. 13 is a perspective view looking in the direction of the plate metal surface from which the threaded stud projects and illustrating the pilot portion concentrically located with respect to the stud; and FIG. 14 is a view of a composite metal-rubber product incorporating the improved integral threaded stud construction piloted and bolted to a structural member.

Similar numerals refer to similar parts throughout the various figures of the drawing.

Steps in the manufacture of the improved products of the invention are shown somewhat diagrammatically in FIGS. 1 through 11. An example of improved plate metal product with an integral threaded stud is shown in FIGS. 12 and 13. Particular structural arrangements and relationships existing in the product of FIGS. 12 and 13 are illustrated somewhat in detail on a very enlarged scale in FIGS. 9, 10, and 11. A typical improved composite metal-rubber product formed utilizing plate metal members having integral threaded stud means is shown in FIG. 14.

While the drawing illustrates the connection of only one stud member to one flat plate metal blank, more than one stud may be connected to any individual metal plate. Also, the plate metal blank illustrated is not necessarily merely a flat blank but may have flanges, etc. formed therein. Finally, the particular metal or alloy and its composition, such as one type of steel which may be used for the plate metal component, is not necessarily the the same as the type or analysis of metal or alloy from which the threaded stud component is formed.

The improved plate metal product of the invention such as indicated generally at 1 in FIGS. 12 and 13 has a plate metal component 2, and a threaded stud member generally indicated at 3 integrally connected to plate metal component 2, with its threaded shank 4 projecting from one or the undersurface 5 of the plate component 2, as illustrated in FIG. 13. A pilot sleeve 6 concentric with stud member 3 also projects from plate surface 5 around stud 3.

The improved plate metal product 1 preferably may be made from a plate metal blank indicated at 7 in FIG. 1 which may be pierced at 8 to form the pierced blank 9 illustrated in FIG. 2. The pierced opening 8 is then shaved to form a truly cylindrical opening 10 in the shaved blank indicated at 11 in FIG. 3 and a sleeve 12 is then preferably cold extruded from the plate metal surrounding the opening 10 to form the extruded blank 13 illustrated in FIG. 4. Sleeve 12 has concentric inner and outer cylindrical surfaces 14 and 15 as shown, an open end 16 which may have a chamfered formation indicated at 17, and a preferably tapered chamfer 18 at the intersection of the inner sleeve surface 14 and top surface 19 of extruded blank 13. The inner sleeve surface 14 defines an opening extending through the sleeve 12, and the chamfer 18 has portions of larger diameter than the diameter of the sleeve opening.

Extruded sleeve 12 in an extruded blank 13 preferably may be made in the manner illustrated and described more in detail in the copending application of Don C. Price Ser. No. 411,753, filed Nov. 17, 1964.

An extruded blank 13 to which a threaded stud is to be integrally connected is placed in die cavity 20 of die member 21 shown in FIG. 5 and 6 wherein the stud insertion step may be carried out. A threaded stud to be inserted preferably having a special formation is generally indicated at 22 and comprises a threaded shank portion 23, a tapered head 24 spaced from the shank, and a spline formation generally indicated at 25 connecting head 24 and shank 23. As shown in FIGS. 5, 7 and 8 the spline formation 25 is of larger radial dimensions than that of the threaded shank portion 23. Central opening 26 of die 21 extending below die cavity 20 has a smaller diameter than the inner diameter of the inner cylindrical surface 14 of sleeve 12, thereby presenting shoulder 27 extending inwardly below open end 16 of sleeve 12.

When blank 13 has been positioned as described in the die means of FIG. 5, with the lower end of spline formation 25 of stud 22 resting on tapered chamfer 18 of blank 13, ram 28 is moved downward pushing tapered head 24 of stud 22 and forcing spline formation 25 into sleeve 12 until the lower end of spline formation 25 reaches shoulder 27. Thereafter, continued downward ram movement rearwardly upsets metal in spline portion 25 by die shoulder 27 and radially expands the metal in stud 22 at the end portion of spline formation 25 adjacent open end 16 of sleeve 12 as indicated generally at 29 in FIG. 6. Thus, the shoulder 27 of die cavity 20 forms a shoulder 6a at the ends of sleeve 12 and of the rearwardly upset and radially expanded stud metal. Upon completion of downward movement of ram 28, as shown in FIG. 6, tapered stud head 24 seats against chamfer 18 formed in blank 13. Thus, metal in the sleeve of blank 13 is trapped between tapered stud head 24 and expanded spline end portion 29 to hold stud 22 integrally connected to blank 13, thereby forming a plate metal product such as shown at 1 in FIGS. 12 and 13.

The entry of spline formation 25 into sleeve 12 cold works and reforms metal in the sleeve as well as in the spline formation. The manner in which the reforming and cold working of the metal takes place is best shown in FIGS. 7 through 11. The relative positions of stud 22 and extruded blank 13 at the start of the stud insertion operation of FIG. 5 are shown on an enlarged scale in FIGS. 7 and 8. Similarly, FIGS. 9, 10, and 11 show on an enlarged scale the reforming of the metal which occurs on the completion of the stud insertion operation also generally shown in FIG. 6.

Spline formation 25 is formed with alternate ribs 30 and grooves 31 having an intermediate pitch diameter represented by the dot-dash line 32 in FIG. 8. Pitch diameter 32 is equal to the diameter of the inner cylindrical surface 14 of sleeve 12. Thus, at the beginning of the stud insertion step, the lower ends 33 of ribs 30 of spline formation 25 rest on tapered annular chamfer 18 of blank 13 as best shown in FIG. 8.

As ram 28 moves downward from the position of FIG. 5 to that of FIG. 6, rib portions 30 of spline formation 25 are forced into the metal adjacent the inner surface 14 of sleeve portion 12 forming complementary grooves 34 in sleeve 12 (FIGS. 10 and 11). Voids 35 (FIG. 10) extend between grooves 31 of stud 22 and the inner sleeve surface 14 as best shown in FIG. 10. This reforming of metal in sleeve 12 to form the complementary grooves 34 during stud insertion continues until the lower ends 33 of spline ribs 30 reach die shoulder 27. Thus, the ribs 30 are embedded in the sleeve metal throughout the sleeve opening from chamfer recess 18 to the open end of sleeve 12.

As ram 28 continues to move downward to the position of FIGS. 6, 10, and 11 when stud head 24 seats in chamfer 18, metal in the lower end of spline formation 25 due to the resistance of die shoulder 27 is rearwardly upset and radially expanded to reform the metal as generally indicated at 29 in FIG. 6.

Thus, metal in the lower ends of spline ribs 30 in the region indicated at 36 in FIGS. 10 and 11 is pushed upward or rearward in respect to the insertion movement of stud 22 and is also expanded generally radially of stud 22 as diagrammatically shown. This expanded and reformed metal portion 36 of spline ribs 30 also reforms metal in the sleeve near the open end of the sleeve as indicated at 37 in FIG. 11. The upsetting and outward expansion of the spline rib portions 36 pushes the spline rib portions 36 completely into the sleeve metal is indicated at 38 in FIG. 9. At the same time, the lower ends of grooves 31 are similarly expanded outward as shown in FIGS. 10 and 11 at 39 so as to be completely filled with sleeve metal in the region indicated at 40 in FIGS. 9 and 10. Thus, the radially expanded spline portions 36 and 39 have had greater radial dimensions than those of the remaining rib and groove portions 30 and 31 as shown in FIG. 11.

However, care is exercised in determining the amount of metal in sleeve 12 and stud 22 which can be contained in die cavity 20 such that sleeve metal does not move upward or radially inward of stud 22 to flow into void areas 35 remaining between expanded groove end portion 39 and stud head 24. Substantial metal flow from the sleeve into or completely filling void 35 if occurring would be accompanied by loosening of the adjacent metal contact between rib portions 30 and sleeve metal at the upper ends of the ribs above the upset portions 36 thereof. This could seriously decrease the efficiency of the integral connection established between the stud and plate metal part.

Meanwhile, during the upsetting and expanding of metal in the lower ends of the spline ribs, the metal in the lower end of sleeve 12, which has the somewhat chamfered shape indicated at 17 in FIG. 8, completely fills out die cavity 20 to eliminate voids, as indicated at 41 in FIGS. 10 and 11.

The reformed spline portions 37 and 39 trap metal in sleeve 12 between reformed portions 36 and 39 and head 24 of stud 22 to prevent stud 22 from being withdrawn from the sleeve short of destruction of the parts.

At the same time, interengagement between spline rib portions 30, and the grooves 34 formed in sleeve metal by such spline rib portions, prevent rotation of stud 22 with respect to sleeve 12. In this manner stud 22 is permanently connected or integrated or unified within the sleeve of the metal blank with the threaded shank extending from the surface of the blank from which the sleeve projects.

During the stud insertion step, concentricity is maintained between stud 22 and the outer cylindrical surface 15 of sleeve 12 by the die cavity 20; and sleeve 12 is sized accurately as to length. This produces a concentric sleeve or annular boss or pilot sleeve generally indicated at 6 in FIG. 13 surrounding the upper end of the threaded portion 4 of the stud at the surface 5 of the plate metal product from which the stud projects. As shown in FIGS. 6, 10, 11, 13 and 14, the annular boss or pilot sleeve accurately sized as to length terminates in an annular shoulder surface 6a spaced from the plate surface 5, the shoulder surface 6a being formed by the expanded and reformed spline rib metal 36 and the filled out sleeve metal 41.

Referring to FIG. 14, several plate metal parts 42 and 43 may be molded and bonded together by rubber 44 in spaced relation with flat sides opposed and bonded to the intervening rubber. Either of the plates 42 or 43 may have one or more studs 45 projecting from one side only of the plate member. A dimple 46, if desired, may be formed in member 42. Each of studs 45 is surrounded by annular boss 47 provided by the pilot sleeve portion 6 of FIGURE 13, concentric therewith as described. The composite metal-rubber product 48 thus provided may be installed as a motor mount in automotive assembly or in any other equipment where the cushioning of the rubber is desired. Plate member 42 will rest on a frame member 49 with boss 47 piloted in an opening 50 at predetermined position and stud 45 clamped to member 49 by nut 51. Dimple 46 may be engaged in a second opening 52 in frame 49 to prevent rotating movement of member 42 with respect to frame member 49.

An opening 53 at predetermined location in the other structural member 54 to be connected to member 49 is then received over pilot portion 47 of member 43 and stud 45 is bolted to member 54 by nut 55.

Heretofore, composite metal-rubber products equipped with a threaded stud extending from one surface of one of the metal parts in prior devices had a stud head projecting from the other surface of the part and embedded in the rubber bonded to said metal part other surface. Such a head projecting into rubber 44 of product 48 is eliminated in the improved product illustrated, thus, giving the composite product uniform rubber characteristics throughout for the rubber 44 intervening and bonded to members 42 and 43. The elimination of the stud heads projecting from the metal members into the rubber in the composite metal-rubber part 48 very substantially increases the life of the part in withstanding torque, shock, and dead weight loading to which the product is subjected in use when forming a part of automotive construction when the automobile is operated.

Although the improved product has the special advantages described when the threaded stud projects from one surface only of the plate metal part with the opposite surface presenting a flat face at the stud head and surrounding the stud head as best illustrated in FIG. 12, and when the metal component with an integral threaded stud is intended to become a part of a composite metal-rubber product such as illustrated in FIG. 14; nevertheless, where the metal component with an integral stud is used in other structural applications, the stud need not necessarily project from one surface only of the plate metal. Integrated connection between a stud 3 and a plate metal member 2 may be established in the manner described even though a stud portion projects above the tapered stud head portion 24 which is seated in chamfer recess 18.

Accordingly, the present invention provides new products having the many new properties and characteristics described which solve problems long-standing in the art and achieve the new results indicated.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention and new products are by way of example, and the scope of the invention is not limited to the exact details, sizes, etc. described or shown because various products of various sizes incorporating the fundamental structures and concepts of the invention may be made without departing from the fundamental principles set forth.

Although the terms, "sheet metal" and "plate metal" are used herein, when referring to various gauges of material, since the invention is applicable to products manufactured from either sheet or plate metal, it is to be understood that the terms are used more or less synonymously.

Having now described the features, discoveries and principles of the invention, the characteristics of the new products, the manner in which the products may be made, and the advantageous, new and useful results obtained thereby; the new and useful products, structures, devices, elements, arrangements, parts, and relationships, and mechanical equivalents obvious to those skilled in the art are set forth in the appended claims.

Certain methods and procedures for making the improved products of the invention, disclosed but not claimed herein, are claimed in our copending application SN 506-300, filed Nov. 4, 1965.

We claim:

1. In a plate metal product having an integral stud member with a threaded shank projecting from one surface of the product, the combination of a plate metal wall having two surfaces, a tubular sleeve formed with concentric cylindrical inner and outer surfaces projecting integrally from at least one surface of the wall and having an open end remote from the wall, said inner sleeve surface defining an opening extending through the sleeve; an annular tapered countersunk stud head-receiving-recess having portions with a larger diameter than the diameter of said sleeve opening formed in the plate at the intersection between the inner sleeve surface and the other wall surface; a metal stud member having a solid head with a flat outer surface and a tapered portion complementary in contour to the contour of said head-receiving-recess, a threaded shank spaced from said stud head, and axially extending alternate rib and groove spline formations of larger radial dimensions than that of the threaded shank connecting the head portion and threaded shank; the spline rib and groove formations extending axially of the stud member a length greater than the length of the sleeve prior to assembly of the stud in the sleeve; the stud member being telescoped into and the spline ribs being pressed axially into inner sleeve surface metal throughout the length of the sleeve opening; the solid stud head portion being engaged and seated in said recess with its flat outer surface flush with said other wall surface; portions of said spline ribs being embedded in the sleeve metal throughout the length of the sleeve opening from said recess to the open end of the sleeve; portions of the greater length spline rib and groove forming metal adjacent the open end of the sleeve being rearwardly upset and radially expanded to reduced rib length and to greater radial dimensions than the radial dimensions of remaining rib and groove forming metal, thereby trapping sleeve metal axially between the radially expanded spline rib and groove portions and the solid stud head portion; and the tubular sleeve and expanded spline metal at the open end of the sleeve forming a shoulder spaced from said one plate metal wall surface whereby the shouldered sleeve forms a concentric pilot sleeve surrounding the stud projecting from the plate metal wall.

2. The construction defined in claim 1 in which the spline groove portions between the stud head portion and the radially expanded spline rib and groove portions are spaced from the inner sleeve surface to form voids.

References Cited

UNITED STATES PATENTS

| | | | |
|---|---|---|---|
| 1,112,525 | 10/1914 | Darling | 151—41.73 X |
| 1,332,240 | 3/1920 | Ward | 248—3 |
| 1,899,293 | 2/1933 | Robertson | 248—10 |
| 1,939,848 | 12/1933 | Haushalter | 248—10 |
| 2,292,536 | 8/1942 | McCabe et al. | 248—10 X |
| 2,612,073 | 9/1952 | Taylor | 151—41.72 X |
| 3,127,919 | 4/1964 | Swanstrom | 151—41.73 |
| 3,259,161 | 7/1966 | Rosan | 151—41.73 |

FOREIGN PATENTS

| | | |
|---|---|---|
| 471,413 | 9/1937 | Great Britain. |
| 690,252 | 4/1953 | Great Britain. |

ROY D. FRAZIER, *Primary Examiner.*

CHANCELLOR E. HARRIS, *Examiner.*

R. P. SEITTER, *Assistant Examiner.*